United States Patent [19]
Goodwin

[11] 3,935,839
[45] Feb. 3, 1976

[54] FACE FLY DEVICE

[76] Inventor: Roy Goodwin, Rte. 2, Lancaster, Mo. 63548

[22] Filed: May 23, 1974

[21] Appl. No.: 472,619

[52] U.S. Cl. ................................ 119/156; 119/157
[51] Int. Cl.² ........................................ A01K 29/00
[58] Field of Search ............ 119/156, 157, 159, 106

[56] References Cited
UNITED STATES PATENTS

| | | | |
|---|---|---|---|
| 2,586,761 | 2/1952 | Eskola | 119/159 |
| 3,167,055 | 1/1965 | McLaughlin | 119/157 |
| 3,756,200 | 9/1973 | Ohlhausen | 119/156 |

Primary Examiner—Louis G. Mancene
Assistant Examiner—Peter K. Skiff
Attorney, Agent, or Firm—Zarley, McKee, Thomte & Voorhees

[57] ABSTRACT

A face fly device comprising a flexible bag-like container having a compartment area provided therein for receiving an insecticide mixed with oil or diesel fuel. A pair of flaps are provided on the upper end of the container which are riveted to the upper lobe of the animal's ear. A flexible wick extends downwardly from the container and is positioned adjacent the animal's face. The insecticide runs down the wick and prevents face flies from bothering the animal. The container and the upper portion of the wick are encapsulated with a liquid impervious material to prevent the insecticide from objectionably flowing or oozing therefrom. The insecticide is inserted into the container means with a conventional syringe or the like.

9 Claims, 6 Drawing Figures

FACE FLY DEVICE

BACKGROUND OF THE INVENTION

This invention relates to a face fly device and more particularly to a flexible bag-like container which is secured to the upper lobe of the animal's ear and which has a wick means extending downwardly adjacent the animal's face.

Face flies are extremely troublesome and annoying to animals. Many devices have been used in an effort to eliminate the face fly problem but none of the devices adequately or efficiently transfers insecticide or the like to the animal's face so that the face flies will be repelled thereby.

Therefore, it is a principal object of the invention to provide an improved face fly device.

A further object of the invention is to provide a face fly device comprising a flexible bag-like container which is secured to the upper lobe of the animal's ear and which has a wick means extending downwardly therefrom.

A further object of the invention is to provide a face fly device which is filled with an insecticide mixture.

A further object of the invention is to provide a face fly device containing an insecticide mixture which is secured to the upper lobe of the animal's ear.

A still further object of the invention is to provide a face fly device which is economical of manufacture and durable in use.

These and other objects will be apparent to those skilled in the art.

DESCRIPTION OF THE PREFERRED EMBODIMENT

Figures 1, 2, 3:
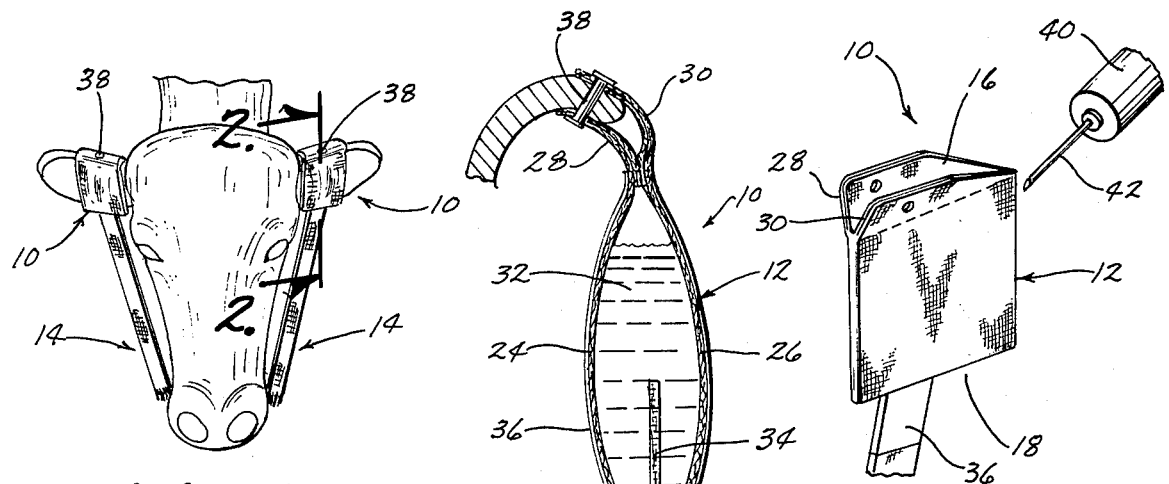
FIG. 1 is a front view of an animal's head having a pair of the devices of this invention mounted on the ears thereof.
FIG. 2 is an enlarged sectional view seen on lines 2—2 of FIG. 1.
FIG. 3 is a partial perspective view of the device illustrating the means by which the insecticide is inserted into the insecticide compartment.

The face fly device of this invention is referred to generally by the reference numeral 10 comprising generally a bag-like container 12 having a wick 14 extending downwardly therefrom. For purposes of description, container 12 will be described as comprising a top 16, bottom 18, forward end 20, rearward end 22, and inner and outer sides 24 and 26.

Container 12 is preferably comprised of a woven cotton duck material and is sewn with the seams inside as illustrated in the drawings so as to prevent any raveling of the bag after it is affixed to the ear of a cow or the like. Container 12 is provided with a pair of flaps 28 and 30 which extend upwardly therefrom and which have openings formed therein for receiving a rivet or the like. Container 12 is formed so as to define a compartment area 32 therein which will be filled with a suitable and conventional insecticide mixed with No. 30 oil or diesel fuel.

Figures 4, 5, 6:
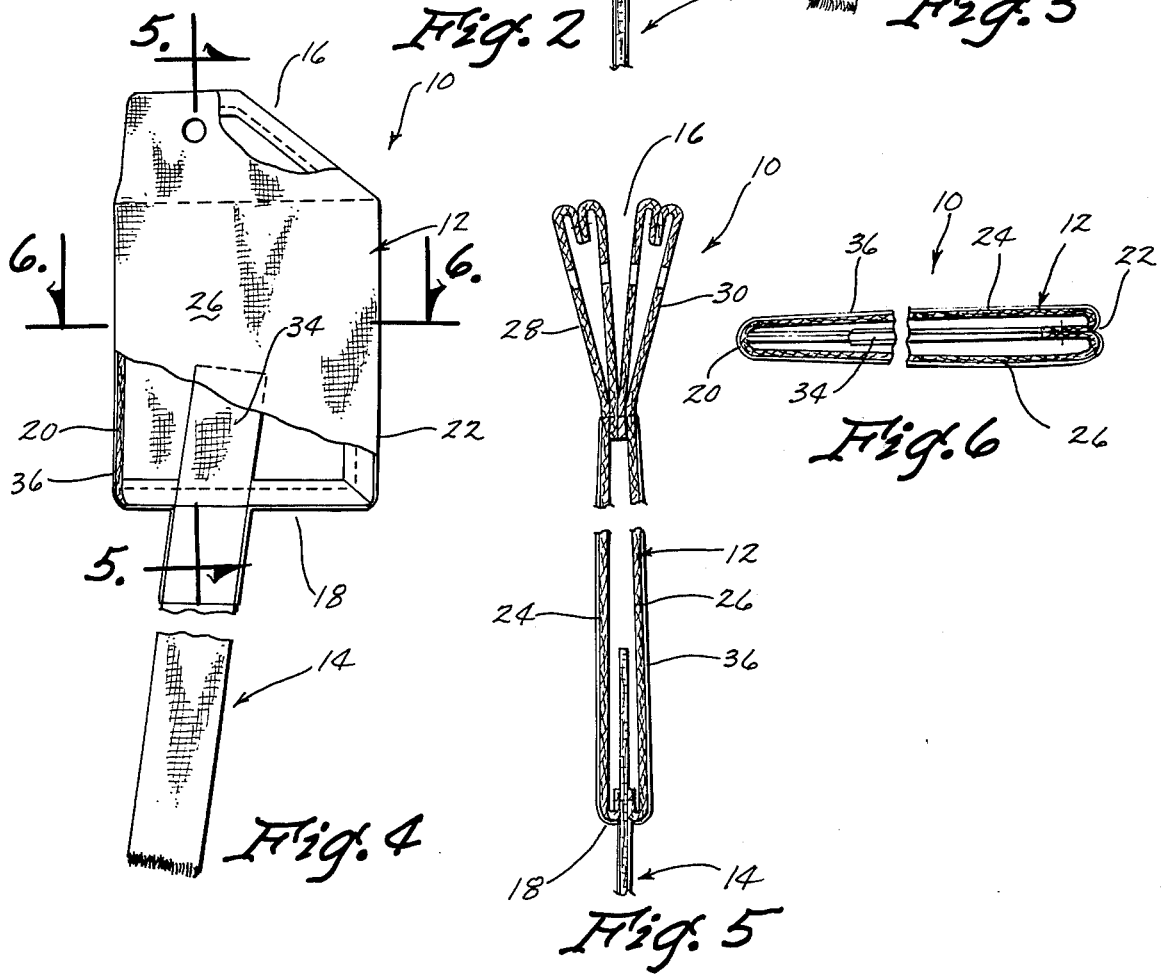
FIG. 4 is a side elevational view of the device with portions thereof cut-away to more fully illustrate the invention.
FIG. 5 is a sectional view seen on lines 5—5 of FIG. 4.
FIG. 6 is a sectional view seen on lines 6—6 of FIG. 4.

Wick 18 is secured by sewing to the container 12 and has its upper end 34 in communication with the compartment area 32. As illustrated in FIG. 4, wick 14 extends downwardly and forwardly from the container 12. The container 12 and the exposed upper portion of the wick 14 are encapsulated with a liquid impervious material generally referred to by the reference numeral 36 to prevent the insecticide from objectionably oozing therefrom. As seen in FIG. 4, the flaps at the upper end of the device are tapered at their rearward ends to facilitate the flaps being extended over the upper lobe of the animal's ear as illustrated in FIG. 2. The flaps 28 and 30 are secured to the upper lobe of the animal's ear by means of a rivet 38 which extends therethrough. FIG. 3 illustrates the manner in which the compartment area 32 is filled with the insecticide. A conventional syringe 40 is filled with the insecticide and the needle 42 is inserted into the container 12 so as to be in communication with the compartment area 32. When the compartment area 32 has been filed, the needle 42 is withdrawn therefrom.

The device is secured to the upper lobe of the cow's ear in the manner illustrated in FIGS. 1 and 2 so that the container 12 is adjacent the ear and so that the wick 14 extends downwardly adjacent the animal's face. The wick 14 has a length sufficient so that its lower end terminates just above the animal's mouth. The insecticide travels down the wick 14 and the movement of the animal causes the wick 14 to transfer the insecticide to the animal's face to repel the face flies. During periods of precipitation, face flies are not a problem and the insecticide will not travel down the wick 14 since the wick 14 will be "sealed" by the water. When the precipitation ends, the wick 14 dries out and the insecticide flows downwardly along the length of the wick 14.

All of the identification material which is presently secured to the ears of the cows may be placed on the face of the bag. This identification material could include identification numbers, shot records, etc. Thus, not only is a face fly device provided but a means of conveniently securing the identification material to the animal is also provided. Thus it can be seen that the invention accomplishes at least all of its stated objectives.

I claim:

1. A face fly device comprising,
   a flexible container means having upper and lower ends,
   said container means having a compartment area provided therein for receiving a face fly repellant liquid therein,
   means on the upper end of said container means for securing said container means to the ear of an animal,
   and a wick means having upper and lower ends, said upper end of said wick means being in communication with the liquid in said compartment area, said wick means extending downwardly from said container means so that said wick means will be positioned adjacent the animal's face.

2. The device of claim 1 wherein said container means has rearward and forward ends relative to the animal's face and wherein said wick means extends downwardly and forwardly from said container means.

3. The device of claim 2 wherein said means on the upper end of said container means comprises means for securing said container means to the upper lobe of the animal's ear.

4. The device of claim 3 wherein said means on the upper end of said container means comprises a pair of spaced apart flaps which may be positioned on opposite sides of the upper lobe of the animal's ear, and a rivet means extending through said flaps and the animal's ear.

5. The device of claim 1 wherein said container means is comprised of a cotton duck material.

6. The device of claim 1 wherein said wick means has a length sufficient so that the lower end thereof extends below the animal's eye to approximately the animal's mouth.

7. The device of claim 1 wherein said container means is encapsulated with a liquid impervious material.

8. The device of claim 7 wherein the upper portion of said wick means is also encapsulated with the liquid impervious material.

9. The device of claim 1 wherein said container means has an area provided thereon for receiving animal identification data thereon.

* * * * *